(12) United States Patent
Malischewski et al.

(10) Patent No.: US 12,253,053 B2
(45) Date of Patent: Mar. 18, 2025

(54) METHOD AND DEVICE FOR SUPPLYING A HYDROGEN INTERNAL COMBUSTION ENGINE OF A MOTOR VEHICLE WITH HYDROGEN

(71) Applicant: MAN Truck & Bus SE, Munich (DE)

(72) Inventors: Thomas Malischewski, Heilsbronn (DE); Bruno Barciela Díaz-Blanco, Nuremberg (DE)

(73) Assignee: MAN Truck & Bus SE, Munich (DE)

( * ) Notice: Subject to any disclaimer, the term of this patent is extended or adjusted under 35 U.S.C. 154(b) by 0 days.

(21) Appl. No.: 17/626,803

(22) PCT Filed: Jul. 3, 2020

(86) PCT No.: PCT/EP2020/068770
§ 371 (c)(1),
(2) Date: Jan. 12, 2022

(87) PCT Pub. No.: WO2021/008897
PCT Pub. Date: Jan. 21, 2021

(65) Prior Publication Data
US 2022/0260040 A1    Aug. 18, 2022

(30) Foreign Application Priority Data

Jul. 13, 2019  (DE) .................... 10 2019 004 905.5

(51) Int. Cl.
*F02M 21/02*     (2006.01)
*F02M 21/06*     (2006.01)

(52) U.S. Cl.
CPC ........ *F02M 21/06* (2013.01); *F02M 21/0206* (2013.01); *F02M 21/0227* (2013.01); *F02M 21/023* (2013.01)

(58) Field of Classification Search
CPC . F02M 21/0206; F02M 21/0227; F02M 21/06
(Continued)

(56) References Cited

U.S. PATENT DOCUMENTS

| 4,211,537 A | * | 7/1980 | Teitel | ................... | F17C 11/005 |
| | | | | | 123/3 |
| 4,290,267 A | * | 9/1981 | Buchner | ................... | F02G 5/02 |
| | | | | | 123/3 |

(Continued)

FOREIGN PATENT DOCUMENTS

| CN | 1732337 A | 2/2006 |
| CN | 101929374 A | 12/2010 |

(Continued)

OTHER PUBLICATIONS

German Search Report issued in German Patent application No. 102019004905.5 dated Mar. 31, 2020. No English translation available.

(Continued)

*Primary Examiner* — Erick R Solis
(74) *Attorney, Agent, or Firm* — Weber Rosselli & Cannon LLP

(57) ABSTRACT

The invention relates to, inter alia, a device for supplying a hydrogen internal combustion engine of a motor vehicle with hydrogen. The device has a storage tank for a fluid containing a carrier agent enriched with hydrogen. The device has a first heat exchanger for heating the fluid by transferring heat from a coolant of the hydrogen internal combustion engine and a second heat exchanger for additionally heating the fluid by transferring heat from an exhaust flow of the hydrogen internal combustion engine. The device provides a highly energy-efficient system that makes appropriate use of the thermal energy in the exhaust and the thermal energy in the coolant.

21 Claims, 1 Drawing Sheet

Figure 1:
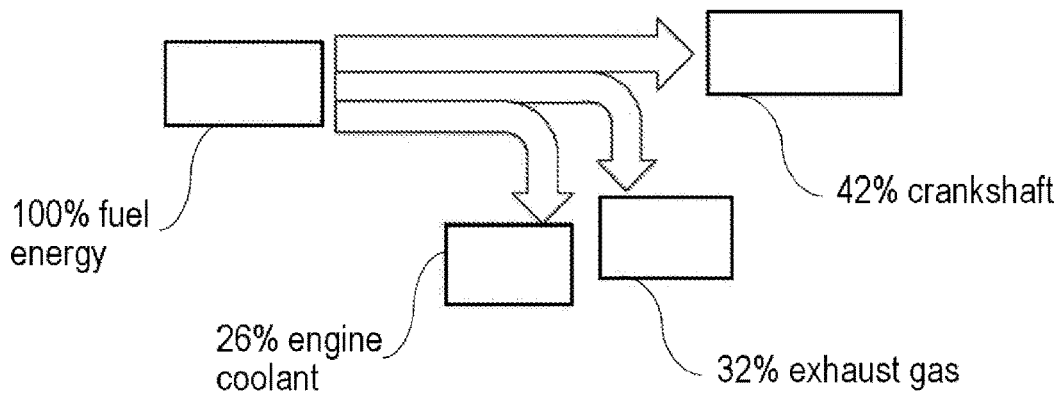

(58) Field of Classification Search
USPC .............................. 123/DIG. 12, 3, 543–557
See application file for complete search history.

(56) References Cited

U.S. PATENT DOCUMENTS

| | | | | |
|---|---|---|---|---|
| 4,318,369 | A | * | 3/1982 | Cronyn .................. F02B 43/10 123/3 |
| 4,424,771 | A | * | 1/1984 | Lovercheck ............. F02B 1/02 123/3 |
| 5,092,281 | A | * | 3/1992 | Iwaki .................. B66F 9/07572 123/3 |
| 5,359,968 | A | * | 11/1994 | Shiraishi ............... F17C 11/005 123/3 |
| 7,654,232 | B2 | * | 2/2010 | Ishimaru .................. C01B 3/22 123/3 |
| 2007/0028905 | A1 | * | 2/2007 | Shinagawa ............... C01B 3/26 123/575 |
| 2008/0110420 | A1 | | 5/2008 | Ishimaru et al. |
| 2008/0260630 | A1 | * | 10/2008 | Pez ........................... C01B 3/22 502/100 |
| 2009/0019768 | A1 | * | 1/2009 | Toseland .............. B01J 19/0093 48/61 |
| 2011/0011354 | A1 | * | 1/2011 | Dincer ................... C01B 3/047 123/3 |
| 2016/0214858 | A1 | | 7/2016 | Cooper et al. |
| 2022/0268200 | A1 | * | 8/2022 | Seba ....................... F02B 43/02 |

FOREIGN PATENT DOCUMENTS

| | | |
|---|---|---|
| CN | 105275625 A | 1/2016 |
| DE | 10306145 A1 | 8/2004 |
| DE | 102005025615 A1 | 12/2006 |
| DE | 102008034221 A1 | 1/2010 |
| DE | 102010049859 A1 | 7/2011 |
| DE | 102010038490 A1 | 2/2012 |
| DE | 102012222105 A1 | 6/2014 |
| DE | 102015225394 A1 | 6/2017 |
| WO | 2015061215 A2 | 4/2015 |
| WO | 2020035307 A1 | 2/2020 |

OTHER PUBLICATIONS

International Search Report with English translation and Written Opinion issued in PCT/EP2020/068770 dated Aug. 7, 2020, 15 pages.
Communication after Rule 71(3) EPC issued in European Patent Application No. 20736988.5 dated Jul. 20, 2023 with English translation.
First Office Action issued in Chinese Patent Application No. 202080037853.6 dated Mar. 30, 2024 with English translation.
Second Office Action issued in Chinese Patent Application No. 202080037853.6 dated Sep. 13, 2024 with English translation.

* cited by examiner

100% fuel energy

42% crankshaft

26% engine coolant

32% exhaust gas

METHOD AND DEVICE FOR SUPPLYING A HYDROGEN INTERNAL COMBUSTION ENGINE OF A MOTOR VEHICLE WITH HYDROGEN

CROSS-REFERENCE TO RELATED APPLICATIONS

This application is a 371 application of PCT/EP2020/068770 filed Jul. 3, 2020, which claims benefit of and priority to German Patent Application Serial No. DE102019004905.5 filed Jul. 13, 2019, the disclosures of the above-identified applications are hereby incorporated by reference in their entirety.

The present disclosure relates to a method and a device for supplying a hydrogen internal combustion engine of a motor vehicle, preferably a commercial vehicle, with hydrogen.

Two systems are particularly suitable for today's hydrogen applications in the mobile sector: firstly, pressure storage at up to 700 bar and, secondly, liquid hydrogen storage at −253° C. For both systems, very high fueling costs are to be expected in order to provide an acceptable range for commercial vehicles.

For stationary applications and in the concept stage for mobile applications, there is also the possibility of the chemical incorporation of hydrogen by means of liquid organic hydrogen carriers (LOHC). In this method, the hydrogen is chemically bonded to a previously unladen carrier material or carrier medium (LOHC−). In order to release the hydrogen again from the LOHC+, it is necessary to supply thermal energy.

DE 10 2008 034 221 A1 discloses a fuel supply device for a motor vehicle which can be operated with hydrogen. A fuel supply device for supplying an internal combustion engine of a motor vehicle comprises at least a first storage tank for a carrier medium enriched with hydrogen, in particular LOHC, and a second storage tank for a dehydrogenated carrier medium. A pressure- and temperature-resistant reactor vessel is incorporated, which can carry out at least one heat-exchanger and one separator function to provide hydrogen for the internal combustion engine. An exhaust line of the internal combustion engine is passed through the reactor vessel and, after leaving the reactor vessel, via a heat exchanger to an exhaust outlet opening.

DE 10 2010 038 490 A1 discloses a fuel supply device for a hydrogen motor vehicle. A countercurrent heat exchanger is connected to a reactor vessel by means of its own connecting lines. The heat exchanger is connected to the internal combustion engine by means of a line carrying heat transfer medium, in particular cooling water or exhaust gases of an internal combustion engine.

The underlying object of the present disclosure is that of providing an alternative and/or improved technique for supplying a hydrogen internal combustion engine of a vehicle with hydrogen.

The object is achieved by the features of the independent claims. Advantageous developments are indicated in the dependent claims and the description.

The present disclosure provides a device for supplying a hydrogen internal combustion engine (for example a hydrogen reciprocating-piston internal combustion engine) of a motor vehicle, preferably a commercial vehicle (for example a truck or bus), with hydrogen. The device has a storage tank for a fluid, which comprises a carrier medium (e.g. a liquid carrier medium) enriched with hydrogen, preferably LOHC. The device has a first heat exchanger, which is arranged to receive the fluid downstream of the storage tank and is designed to heat the fluid by heat transfer from a coolant, preferably cooling water, of the hydrogen internal combustion engine. The device has a second heat exchanger, which is arranged to receive the heated fluid downstream of the first heat exchanger and is designed to additionally heat the fluid by heat transfer from an exhaust gas flow of the hydrogen internal combustion engine. It is possible for the device to have a catalytic converter, which is arranged to receive the additionally heated fluid downstream of the second heat exchanger and is designed to release the hydrogen from the fluid (for example at a temperature in a range between 300° C. and 350° C.).

The device provides a highly energy-efficient system in which good use is made of the thermal energy in the exhaust gas and the thermal energy in the coolant. Connecting the first and second heat exchangers makes it possible to increase the temperature of the fluid in stages with respect to the temperature level respectively provided by the coolant and the exhaust gas. The two heat exchangers together enable the hydrogen internal combustion engine to be supplied continuously and reliably with hydrogen. It has been found that the energy required to release the hydrogen from the carrier medium corresponds to approximately 33% of the energy content of the hydrogen. This required thermal energy can be provided particularly reliably only by utilizing the waste heat of the hydrogen internal combustion engine in the form of the coolant and in the form of the exhaust gas. Compared with the prior art, therefore, security of supply with hydrogen can be increased, and for this purpose only (waste) heat sources of the hydrogen internal combustion engine which are present in any case are utilized.

The first heat exchanger can expediently be arranged in a coolant circuit of the hydrogen internal combustion engine, for example in an outlet of the coolant circuit.

The second heat exchanger can preferably be arranged in an exhaust system of the hydrogen internal combustion engine, preferably downstream of a turbine of the exhaust system.

In one exemplary embodiment, the device can furthermore have at least one bypass line, preferably an exhaust gas bypass line and/or a fluid bypass line for the fluid, which is preferably arranged to bypass the second heat exchanger. The exhaust gas bypass line can expediently branch off from a main exhaust line upstream of the second heat exchanger and/or be connected to a main exhaust line downstream of the second heat exchanger. For example, the fluid bypass line can branch off from a main fluid line for the fluid upstream of the second heat exchanger and/or can be connected to a main fluid line downstream of the second heat exchanger. The bypass line can make it possible for temperature control with regard to the temperature increase of the fluid in the second heat exchanger to take place.

In a further development, the device has at least one valve, which is expediently arranged to adapt the exhaust gas flow and/or the fluid flow to the second heat exchanger and/or to the bypass line. The valve can preferably be controlled in such a way that overheating of the heated fluid in the second heat exchanger above a predetermined temperature limit (for example greater than or equal to 360° C.) is prevented. The valve can be used, for example, to divide an exhaust gas mass flow of the hydrogen internal combustion engine (or a fluid mass flow of the fluid from the first heat exchanger) into a first partial flow to the second heat exchanger and a second partial flow to the bypass line. By controlling the quantity of the exhaust gas flow through the second heat exchanger, a temperature of the fluid at the outlet of the second heat exchanger can be influenced and, in this way, it is possible, for example, to prevent unwanted overheating of the fluid.

In a further exemplary embodiment, the valve is arranged at a branch of the bypass line (for example from a main exhaust line or a main fluid line) or in the bypass line. Alternatively, it is also possible, for example, for the valve to be arranged downstream of a branch of the bypass line and/or upstream of the second heat exchanger.

In a further exemplary embodiment, the valve is temperature-controlled, preferably indirectly or directly, with respect to a temperature of the fluid at an inlet and/or an outlet of the second heat exchanger. In this way, it is possible, for example, to set an exhaust gas flow quantity fed to the second heat exchanger in such a way that a desired temperature of the fluid is established at the outlet of the second heat exchanger.

In one embodiment, the first heat exchanger is designed to heat the fluid to a temperature level greater than or equal to 90° C., preferably between 90° C. and 110° C., by heat transfer from the coolant. In this way, the fluid can be brought approximately to the temperature level of the coolant of the hydrogen internal combustion engine, for example. During this process, the coolant can cool down. The otherwise unused waste heat of the coolant can be usefully exploited for the necessary heating of the fluid in order ultimately to enable the hydrogen to be released from the heated fluid.

In a further embodiment, the second heat exchanger is designed to heat the heated fluid (e.g. heated to a temperature between 90° C. and 110° C.) by heat transfer from the exhaust gas flow to a temperature level greater than or equal to 300° C., preferably between 300° C. and 360° C., and/or to a temperature level required to release the hydrogen from the fluid. In this way, it is likewise possible to a large extent to make good use of the exhaust gas enthalpy for the necessary heating of the fluid.

In one embodiment variant, the first heat exchanger is designed as a plate heat exchanger and/or the first heat exchanger is produced from or consists of an aluminum material. In this way, a particularly large amount of thermal energy can be transferred from the coolant to the fluid.

In a further embodiment variant, the device has a buffer tank, which is preferably arranged to store the released hydrogen downstream of the catalytic converter. The at least one combustion chamber of the hydrogen internal combustion engine can expediently be arranged downstream of the buffer tank. The at least one combustion chamber can be supplied with hydrogen from the buffer tank. The buffer tank can also be used to store sufficient gaseous hydrogen for a cold start of the hydrogen internal combustion engine. The buffer tank can likewise serve to allow increased hydrogen consumption of the hydrogen internal combustion engine for a short time under peak load conditions.

In one exemplary embodiment, the buffer tank is embodied as a pressure tank that stores the released hydrogen in gaseous form under pressure, preferably at a pressure less than or equal to 50 bar. In this way, the cost of the buffer tank and the energy consumption of a compressor for delivering the gaseous hydrogen into the buffer tank can be comparatively low.

In a further exemplary embodiment, the buffer tank has a volume of less than or equal to 200 l, preferably in a range between 100 l and 200 l. The buffer tank can thus have a sufficiently large volume to enable continuous operation of the hydrogen internal combustion engine with hydrogen and, in addition, to serve as a buffer under cold start conditions or under peak load conditions.

In a development, the buffer tank is level-monitored and/or pressure-monitored, preferably to maintain storage of a predetermined minimum quantity of hydrogen, which is preferably held for a cold start of the hydrogen internal combustion engine and/or for a peak load (maximum load) of the hydrogen internal combustion engine.

In one embodiment, the device furthermore has a heating device, preferably an electric heating device or a burner, for heating the fluid, which is preferably arranged in or upstream of the catalytic converter. By means of the heating device, the fluid can be heated, under cold start conditions for example, to the temperature level required in the catalytic converter to release the hydrogen. It is also possible for the heating device to be used, in low load operation of the hydrogen internal combustion engine for example, to heat the fluid to the temperature level required in the catalytic converter to release the hydrogen.

In a further embodiment, the device has a further heat exchanger, preferably downstream of the first heat exchanger and/or upstream of the second heat exchanger. The further heat exchanger is preferably designed to heat the fluid by heat transfer from a charge air flow of the hydrogen internal combustion engine. The further heat exchanger can expediently be arranged in a charge air system of the hydrogen internal combustion engine, downstream of a compressor. In this way, the waste heat produced during the cooling of the charge air can also be used to heat the fluid. For example, the further heat exchanger can be arranged downstream of the first heat exchanger and/or upstream of the second heat exchanger.

The present disclosure also relates to a vehicle, preferably a motor vehicle, preferably a commercial vehicle (for example a truck or bus), having a hydrogen internal combustion engine (for example a hydrogen reciprocating-piston internal combustion engine) and the device for supplying hydrogen as disclosed herein. The vehicle makes it possible to achieve the same advantages as already described hereinabove for the device for supplying hydrogen.

It is also possible to use the device as disclosed herein for passenger vehicles, large engines, off-road vehicles, stationary engines, marine engines on watercraft, etc.

The present disclosure also relates to a method for supplying a hydrogen internal combustion engine of a motor vehicle, preferably a commercial vehicle, with hydrogen, preferably using the device for supplying hydrogen as disclosed herein. The method comprises storing a fluid, which comprises a carrier medium (e.g. a liquid carrier medium) enriched with hydrogen, preferably LOHC. The method comprises heating the fluid by heat transfer from a coolant, preferably cooling water, of the hydrogen internal combustion engine. The method comprises additionally heating the heated fluid by heat transfer from an exhaust gas flow of the hydrogen internal combustion engine. The method comprises releasing the hydrogen from the additionally heated fluid. Finally, the method can additionally comprise feeding the released hydrogen to the hydrogen internal combustion engine, for example. The method makes it possible to achieve the same advantages as already described hereinabove for the device for supplying hydrogen.

In one exemplary embodiment, heating the fluid by heat transfer from the coolant heats the fluid to a temperature level greater than or equal to 90° C., preferably between 90° C. and 110° C.

In a further exemplary embodiment, the additional heating of the fluid by heat transfer from the exhaust gas flow heats the fluid to a temperature level greater than or equal to 300° C., preferably between 300° C. and 360° C., and/or to a temperature level required to release the hydrogen from the fluid.

In one embodiment, the method comprises adapting a temperature of the fluid, preferably preventing overheating of the fluid above a predetermined temperature limit, by adapting an exhaust gas quantity available for heat transfer, preferably by means of a controlled, preferably valve-controlled, exhaust gas bypass line. Alternatively or additionally, the method comprises adapting a temperature of the fluid, preferably preventing overheating of the fluid above a predetermined temperature limit, by adapting a fluid flow rate available for heat transfer, preferably by means of a controlled, preferably valve-controlled, fluid bypass line.

In a further embodiment, the method comprises keeping a buffer volume of hydrogen released from the fluid upstream of the hydrogen internal combustion engine for a cold start of the hydrogen internal combustion engine and/or for a peak load of the internal combustion engine.

For example, the method can further comprise partial or complete depletion of the buffer volume for the cold start and/or for the peak load.

Furthermore, the method can expediently comprise (re) filling the buffer volume, preferably under normal operating conditions of the hydrogen internal combustion engine, to a minimum quantity of hydrogen required for the cold start and/or for the peak load.

As used herein, the terms "downstream" or "upstream" refer to a respective flow direction of a context-dependent fluid, e.g. the fluid, the exhaust gas, the coolant, the charge air, etc.

Figure 2:
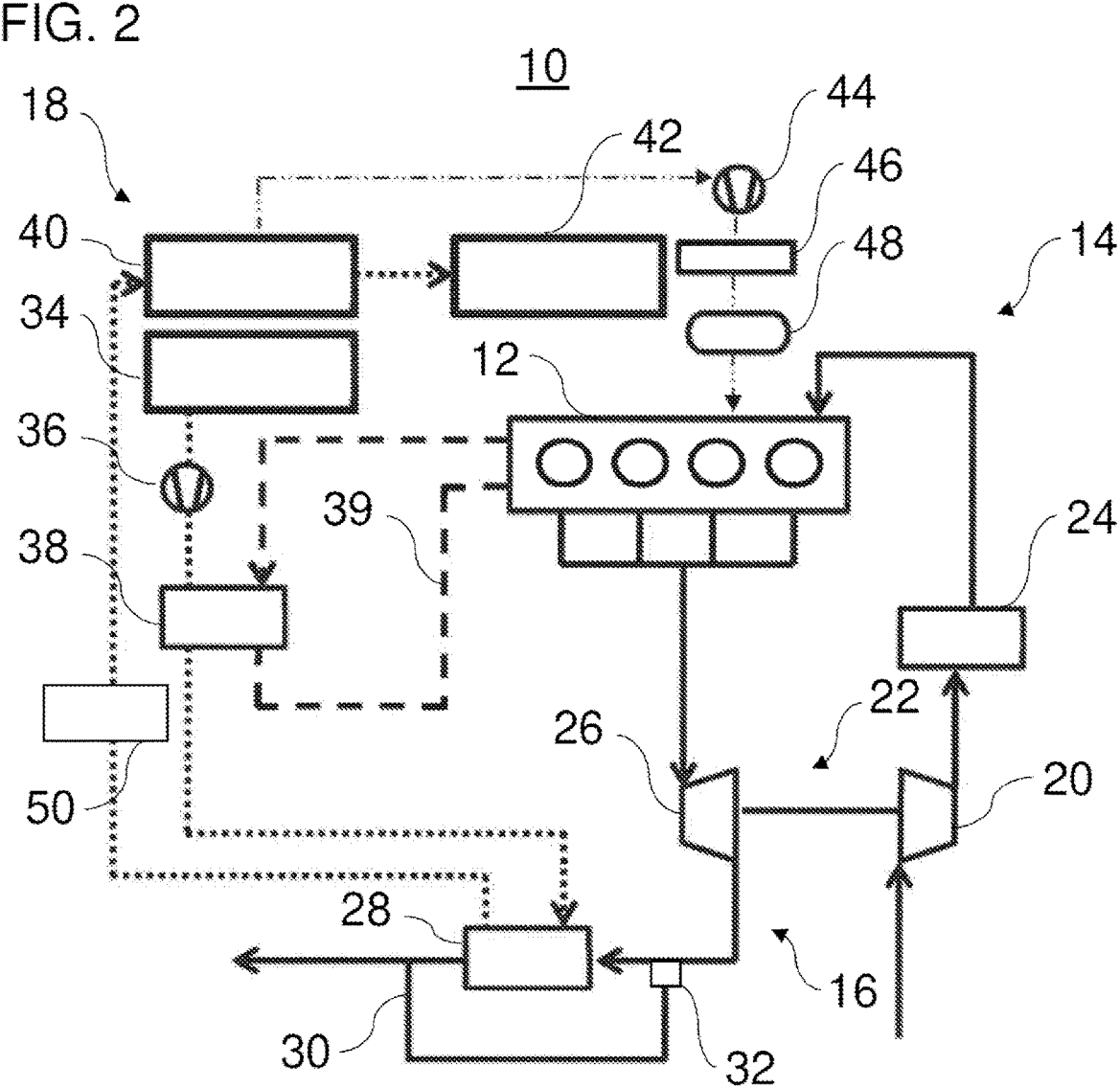

The preferred embodiments and features of the present disclosure which are described above can be combined in any desired way. Further details and advantages of the present disclosure are described below with reference to the appended drawings, in which:

FIG. 1 shows a schematic diagram of illustrative energy flows that may occur in a hydrogen internal combustion engine; and FIG. 2 shows a schematic illustration of an internal combustion engine having a device for supplying hydrogen.

FIG. 1 shows the energy fractions into which the fuel energy of hydrogen is divided in an internal combustion engine operated with hydrogen. 42% of the fuel energy provided by hydrogen is converted into mechanical energy, which can be taken off at the crankshaft. In addition, approximately 32% of the fuel energy provided by hydrogen is converted into thermal energy in the exhaust gas and approximately 26% into thermal energy of an engine coolant, in particular cooling water. This means that about 60% of the fuel energy provided by the hydrogen is not available as mechanically usable energy. Utilization of the (waste) heat energy therefore offers potential for improving the efficiency of a hydrogen internal combustion engine.

FIG. 2 shows an internal combustion engine 10. As a particular preference, the internal combustion engine 10 is included in a motor vehicle, preferably a commercial vehicle, for the purpose of driving the motor vehicle. However, it is also possible to operate the internal combustion engine in a stationary manner or in a watercraft, for example. The internal combustion engine 10 is a hydrogen internal combustion engine which is driven exclusively or at least partially by combustion of hydrogen.

The internal combustion engine 10 has an engine block 12, an intake air system 14, an exhaust system 16 and a device 18 for supplying hydrogen.

The engine block 12 can have one or more cylinders. The cylinders each comprise a combustion chamber, in which hydrogen can be burnt together with air. For each cylinder, combustion drives a rotatable crankshaft, for example via a movable piston, preferably a reciprocating piston.

The intake air system 14 supplies combustion air to the combustion chambers of the engine block 12. The combustion air can be compressed in a compressor 20 of a turbocharger 22, for example. The compressed air can be cooled in a heat exchanger 24 before being fed to the combustion chambers. The heat exchanger 24 is arranged downstream of the compressor 20 and upstream of the engine block 12 in respect of the intake air flow. The intake air system 14 may have other components not shown in detail in FIG. 2, such as a filter, another compressor, another heat exchanger, etc.

The exhaust system 16 carries away the exhaust gases from the combustion chambers of the engine block 12. The exhaust system 16 may include an exhaust turbine 26 of the turbocharger 22. The exhaust system 16 has a heat exchanger 28. With respect to the exhaust gas flow, the heat exchanger 28 is arranged downstream of the exhaust turbine 26.

Upstream of the heat exchanger 28, an exhaust gas bypass line 30 branches off from the (main) exhaust line. The exhaust gas bypass line 30 bypasses the heat exchanger 28. The exhaust gas bypass line 30 is connected to a (main) exhaust gas line downstream of the heat exchanger 28. A valve 32 is arranged at the branch of the exhaust gas bypass line 30. The valve 32 can influence an exhaust gas flow rate through the heat exchanger 28. It is self-evident that, in order to fulfill its task, the valve 32 can also be arranged differently, for example in the exhaust gas bypass line 30 or upstream of the heat exchanger 28.

The valve 32 can have any type of construction and any type of actuation. The valve 32 can be designed, for example, as a safety valve which opens in the event of excessive pressure and/or excessive temperature of the exhaust gas and directs at least some of the exhaust gas through the exhaust gas bypass line 30. It is also possible for the valve 32 to be an adjustable valve with which an exhaust gas flow rate through the heat exchanger 28 and/or the exhaust gas bypass line 30 can be adjusted, being controlled by a control unit of the internal combustion engine 10, for example.

It is possible for the exhaust system 16 to have other components which are not shown separately in FIG. 2, such as, for example, an exhaust gas aftertreatment device, having an SCR device, for example.

The device 18 has a storage tank 34, a pump 36, a heat exchanger 38, heat exchanger 28 and a catalytic converter or a reactor vessel 40.

A preferably liquid carrier medium (hereinafter referred to as the fluid for short) laden with hydrogen, in particular LOHC, can be stored in the storage tank 34. The storage tank 34 may have a filler neck for introducing and replenishing the fluid.

The pump 36 is arranged downstream of the storage tank 34. The pump 36 can draw the fluid from the storage tank 34. The fluid is pumped through heat exchanger 38 and heat exchanger 28 to the catalytic converter 40.

Heat exchanger 38 can be arranged downstream of the storage tank 34 and/or of the pump 36 with respect to the fluid flow. Heat exchanger 38 can be arranged upstream of heat exchanger 28 and the catalytic converter 40. Heat exchanger 38 is expediently designed as a liquid-liquid heat exchanger. Heat exchanger 38 allows heat transfer from a coolant of the internal combustion engine 10 to the fluid. Heat exchanger 38 is thus expediently incorporated in a coolant circuit 39, preferably a cooling water circuit, of the internal combustion engine 10 for cooling the engine block 12. For example, heat exchanger 38 can be integrated in an outlet of the coolant circuit 39.

To promote a particularly large heat transfer from the coolant to the fluid, heat exchanger 38 can expediently be embodied as a plate heat exchanger and/or can be produced from an aluminum material. Other types of construction and/or materials are likewise possible.

In heat exchanger 38, the fluid can be heated, for example, from ambient temperature to a temperature level between 90° C. and 110° C., depending on the design of heat exchanger 38 and the coolant circuit 39. In this step, up to 30%, for example, of the thermal energy required to release the hydrogen can be provided.

Heat exchanger 28 is arranged downstream of heat exchanger 38 and upstream of the catalytic converter 40 in respect of the fluid flow. The heat exchangers 38 and 28 are thus connected in series, wherein the fluid expediently flows first through heat exchanger 38 and then through heat exchanger 28.

Heat exchanger 28 allows heat transfer from the exhaust gas of the internal combustion engine 10 to the fluid. Heat exchanger 28 is thus expediently embodied as a gas-liquid heat exchanger. For example, heat exchanger 28 can be embodied as a plate heat exchanger, a shell-and-tube heat exchanger or a tube-in-tube heat exchanger.

In heat exchanger 28, the fluid already preheated in heat exchanger 38 can be heated to a temperature level between 300° C. and 360° C. In order to avoid overheating of the fluid in heat exchanger 28 to, for example, a temperature above 360° C. in the case of exhaust gases which are too hot, the valve 32 can be operated accordingly in order to direct at least some of the exhaust gas flow through the exhaust gas bypass line 30, if necessary. Accordingly, the valve 32 can be temperature-controlled, e.g. indirectly or directly, with respect to a temperature of the fluid at the inlet and/or the outlet of heat exchanger 28. It is also possible, for example, in addition or as an alternative to the exhaust gas bypass line 30 and the valve 32, to provide a fluid bypass line for the fluid, which bypasses heat exchanger 28 on the fluid side, and a corresponding valve, in order to allow open-loop or closed-loop temperature control in respect of the fluid.

The fluid heated in this way is passed to the catalytic converter 40. In the catalytic converter 40, the fluid is dehydrogenated. The bound hydrogen is released from the carrier medium. The unladen carrier medium, preferably LOHC−, is passed to a further storage tank 42. The storage tank 42 has an outlet branch from which the unladen carrier medium can be pumped out.

The gaseous hydrogen released is delivered by a compressor 44 via a high-pressure line 46 into a pressure or buffer tank 48. From the buffer tank 48, the gaseous hydrogen can be supplied to the combustion chambers of the engine block 12 of the internal combustion engine 10.

The buffer tank 48 can, for example, have a volume in a range between 100 l and 200 l. The buffer tank 48 can store the gaseous hydrogen at a pressure of, for example, less than or equal to 50 bar. The buffer tank 48 can expediently be dimensioned in such a way that, in the case of a cold start of the internal combustion engine 10, there is always sufficient gaseous hydrogen for starting the internal combustion engine. It is also possible for the buffer tank 48 to be dimensioned in such a way that additionally required hydrogen can be provided from the buffer tank 48 at a peak or maximum load of the internal combustion engine 10. Accordingly, the buffer tank 48 can be level-monitored and/or pressure-monitored to ensure that a predetermined minimum quantity of hydrogen is held for a cold start and/or for a peak load.

It is possible for the fluid to be heated further by a heating device 50, for example under cold start conditions of the internal combustion engine 10, before reaching the catalytic converter 40 or in the catalytic converter 40. The heating device 50 can be, for example, an electric heating device or a burner, which preferably burns hydrogen. The heating device 50 can be arranged downstream of heat exchanger 28 and upstream of the catalytic converter 40, for example.

It is also possible for heat exchanger 24 to be used to heat the fluid in addition to heat exchangers 28 and 38, for example. For example, heat exchanger 24 can be arranged downstream of heat exchanger 38 and/or upstream of heat exchanger 28 in respect of the fluid flow.

However, those skilled in the art will recognize that the device 18 disclosed herein by way of example uses an innovative method for feeding hydrogen to the internal combustion engine 10. The method can, for example, use the device 18 or at least some components of the device 18. The method can comprise storing the fluid (preferably liquid carrier medium laden with hydrogen), for example in the storage tank 34. The method may further comprise heating the fluid, for example in heat exchanger 38, and additionally heating the fluid, for example in heat exchanger 28. The hydrogen can be released from the fluid heated in this way, e.g. for supply to combustion chambers of the internal combustion engine 10, for example by means of the catalytic converter 40.

The present disclosure is not restricted to the preferred exemplary embodiments described above. On the contrary, a large number of variants and modifications that likewise make use of the inventive concept and therefore fall within the scope of protection is possible. In particular, the present disclosure also claims protection for the subject matter and the features of the dependent claims independently of the claims to which reference is made. In particular, the individual features of independent claim 1 are each disclosed independently of one another. In addition, the features of the subclaims are also disclosed independently of all the features of independent claim 1 and, for example, independently of the features relating to the presence and/or the configuration of the storage tank, of the first heat exchanger, of the second heat exchanger and/or of the catalytic converter of independent claim 1. All range data herein should be interpreted as disclosed in such a way that all the values which fall within the respective range are, as it were, disclosed individually, e.g. also as respectively preferred narrower outer limits of the respective range.

LIST OF REFERENCE SIGNS 10 internal combustion engine
12 engine block
14 intake air system
16 exhaust system
18 device for supplying hydrogen
20 compressor
22 turbocharger
24 heat exchanger
26 exhaust turbine
28 heat exchanger 30 exhaust gas bypass line
32 valve
34 storage tank
36 pump
38 heat exchanger
39 coolant circuit
40 catalytic converter
42 storage tank
44 compressor
46 pressure line
48 buffer tank
50 heating device

The invention claimed is:

1. A device for supplying a hydrogen internal combustion engine of a motor vehicle with hydrogen, comprising:
a storage tank for a fluid, which comprises a carrier medium enriched with hydrogen;
a first heat exchanger, which is arranged to receive the fluid downstream of the storage tank and is designed to heat the fluid by heat transfer from a coolant of the hydrogen internal combustion engine;
a second heat exchanger, which is arranged to receive the heated fluid downstream of the first heat exchanger and is designed to additionally heat the fluid by heat transfer from an exhaust gas flow of the hydrogen internal combustion engine;
a catalytic converter, which is arranged to receive the additionally heated fluid downstream of the second heat exchanger and is designed to release the hydrogen from the fluid; and
a further heat exchanger, wherein the further heat exchanger is downstream of the first heat exchanger and the further heat exchanger is upstream of the second heat exchanger and the further heat exchanger is designed to heat the fluid by heat transfer from a charge air flow of the hydrogen internal combustion engine.

2. The device as claimed in claim 1, wherein:
the motor vehicle is a commercial vehicle;
the carrier medium enriched with hydrogen is LOHC; or
the coolant is cooling water.

3. The device as claimed in claim 1, further comprising:
a bypass line which is arranged to bypass the second heat exchanger.

4. The device as claimed in claim 3, further comprising:
a valve which is arranged to adapt the exhaust gas flow or the fluid flow to the second heat exchanger or to the bypass line.

5. The device as claimed in claim 4, wherein:
the valve is controlled in such a way that overheating of the heated fluid in the second heat exchanger above a predetermined temperature limit is prevented;
the valve is arranged at a branch of the bypass line or in the bypass line or downstream of a branch of the bypass line and upstream of the second heat exchanger;
the valve is temperature-controlled indirectly with respect to a temperature of the fluid at an inlet or an outlet of the second heat exchanger;
the valve is temperature-controlled directly with respect to a temperature of the fluid at an inlet or an outlet of the second heat exchanger; or
the bypass line is an exhaust gas bypass line or a fluid bypass line.

6. The device as claimed in claim 1, wherein:
the first heat exchanger is designed to heat the fluid to a temperature level greater than or equal to 90° C. by heat transfer from the coolant; or
the second heat exchanger is designed to heat the heated fluid by heat transfer from the exhaust gas flow to a temperature level greater than or equal to 300° C. or to a temperature level required to release the hydrogen from the fluid;
the first heat exchanger is embodied as a plate heat exchanger; or
the first heat exchanger is produced from or consists of an aluminum material.

7. The device as claimed in claim 1, wherein:
the first heat exchanger is designed to heat the fluid to a temperature level between 90° C. and 110° C. by heat transfer from the coolant; or
the second heat exchanger is designed to heat the heated fluid by heat transfer from the exhaust gas flow to a temperature level between 300° C. and 360° C.

8. The device as claimed in claim 1, further comprising a buffer tank, which is arranged to store the released hydrogen downstream of the catalytic converter, wherein:
the buffer tank is embodied as a pressure tank that stores the released hydrogen under pressure;
the buffer tank has a volume of less than or equal to 200 l; or
the buffer tank is level-monitored or pressure-monitored.

9. The device as claimed in claim 8, wherein:
the buffer tank is level-monitored or pressure-monitored to maintain storage of a predetermined minimum quantity of hydrogen, wherein the hydrogen is held for a cold start of the hydrogen internal combustion engine or for a peak load of the hydrogen internal combustion engine.

10. The device as claimed in claim 1, further comprising:
a heating device for heating the fluid.

11. The device as claimed in claim 10, wherein:
the heating device is an electric heating device or a burner; or
the heating device is arranged in or upstream of the catalytic converted.

12. A vehicle comprising:
a hydrogen internal combustion engine; and
the device as claimed in claim 1.

13. The vehicle of claim 12, wherein:
the vehicle is a motor vehicle; or
the vehicle is a commercial vehicle.

14. A method for supplying a hydrogen internal combustion engine of a motor vehicle with hydrogen, comprising:
storing a fluid, which comprises a carrier medium enriched with hydrogen, wherein the carrier medium enriched with hydrogen is LOHC;
heating the fluid by heat transfer from a coolant of the hydrogen internal combustion engine;
additionally heating the heated fluid by heat transfer from an exhaust gas flow of the hydrogen internal combustion engine;
releasing the hydrogen from the additionally heated fluid; and
feeding the released hydrogen to the hydrogen internal combustion engine, wherein method uses the device as claimed in claim 1.

15. The method as claimed in claim 14, wherein:
the motor vehicle is a commercial vehicle;
or
the coolant is cooling water.

16. The method as claimed in claim 14, wherein:
heating the fluid by heat transfer from the coolant heats the fluid to a temperature level greater than or equal to 90° C.; or the additional heating of the fluid by heat transfer from the exhaust gas flow heats the fluid to a temperature level greater than or equal to 300° C. or to a temperature level required to release the hydrogen from the fluid.

17. The method as claimed in claim 14, wherein:
heating the fluid by heat transfer from the coolant heats the fluid to a temperature level between 90° C. and 110° C.; or
the additional heating of the fluid by heat transfer from the exhaust gas flow heats the fluid to a temperature level between 300° C. and 360° C.

18. The method as claimed in claim 14, further comprising:
adapting a temperature of the fluid by adapting an exhaust gas flow quantity available for heat transfer;
adapting a temperature of the fluid by adapting a fluid quantity available for heat transfer;
or
keeping a buffer volume of hydrogen released from the fluid upstream of the hydrogen internal combustion engine for a cold start of the hydrogen internal combustion engine or for a peak load of the internal combustion engine.

19. The method as claimed in claim 14, further comprising:
adapting a temperature of the fluid preventing overheating of the fluid above a predetermined temperature limit, by adapting an exhaust gas flow quantity available for heat transfer by means of a controlled or valve-controlled exhaust gas bypass line; or
adapting a temperature of the fluid preventing overheating of the fluid above a predetermined temperature limit, by adapting a fluid quantity available for heat transfer by means of a controlled or valve-controlled fluid bypass line.

20. The device of claim 1, wherein the fluid is a liquid and the second heat exchanger is designed to additionally heat the liquid by heat transfer from an exhaust gas flow of the hydrogen internal combustion engine.

21. The method of claim 14, further comprising further heating the heated fluid by heat transfer from a charge air flow of the hydrogen internal combustion engine.

* * * * *